US009216591B1

(12) United States Patent
Rozier et al.

(10) Patent No.: US 9,216,591 B1
(45) Date of Patent: Dec. 22, 2015

(54) METHOD AND SYSTEM FOR MUTUAL AUGMENTATION OF A MOTIVATIONAL PRINTING AWARENESS PLATFORM AND RECOMMENDATION-ENABLED PRINTING DRIVERS

(71) Applicant: Xerox Corporation, Norwalk, CT (US)

(72) Inventors: David Rozier, Bernin (FR); Yves Hoppenot, Notre-Dame-de-Mèsage (FR); Frederic Roulland, Le Versoud (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/580,795

(22) Filed: Dec. 23, 2014

(51) Int. Cl.
*B41J 29/38* (2006.01)
*B41J 3/407* (2006.01)

(52) U.S. Cl.
CPC .................................... *B41J 3/407* (2013.01)

(58) Field of Classification Search
CPC ..... B41J 3/407; H04N 21/4753; H04L 63/04; H04L 63/00; H04L 65/103
See application file for complete search history.

(56) References Cited

U.S. PATENT DOCUMENTS

| | | | |
|---|---|---|---|
| 5,590,003 A | 12/1996 | Dunfield et al. | |
| 5,706,452 A | 1/1998 | Ivanov | |
| 6,606,744 B1 * | 8/2003 | Mikurak | H04L 29/06 717/174 |
| 6,860,422 B2 | 3/2005 | Hull et al. | |
| 6,948,070 B1 * | 9/2005 | Ginter | G06F 21/10 348/E5.006 |
| 7,072,066 B2 | 7/2006 | Guddanti | |
| 7,236,652 B2 | 6/2007 | Kasutani | |
| 7,357,300 B2 | 4/2008 | Hull et al. | |
| 7,424,974 B2 | 9/2008 | Hull et al. | |
| 7,567,946 B2 | 7/2009 | Andreoli et al. | |
| 7,623,256 B2 | 11/2009 | Ciriza et al. | |
| 7,680,341 B2 | 3/2010 | Perronnin | |
| 7,742,185 B2 | 6/2010 | Lofthus et al. | |
| 7,756,341 B2 | 7/2010 | Perronnin et al. | |
| 7,804,611 B2 | 9/2010 | Castellani | |
| 7,843,585 B2 | 11/2010 | Nobutani | |
| 7,865,089 B2 | 1/2011 | Andreoli et al. | |
| 7,877,427 B2 | 1/2011 | Nakagawa | |
| 7,885,466 B2 | 2/2011 | Perronnin | |
| 7,885,794 B2 | 2/2011 | Liu et al. | |
| 7,933,454 B2 | 4/2011 | Bressan et al. | |

(Continued)

FOREIGN PATENT DOCUMENTS

JP           2003248570 A       9/2003

OTHER PUBLICATIONS

Blei et al. "Latent dirichlet allocation" J. Machine Learning Res., 2003, 3:993-1022.

(Continued)

*Primary Examiner* — Thinh Nguyen
(74) *Attorney, Agent, or Firm* — Fay Sharpe LLP (57) ABSTRACT

This disclosure provides a method and system to promote the reduction of an environmental impact by one or more users of a printing system. According to an exemplary embodiment, a printing system includes a motivational platform and an operatively associated printer driver, the motivational platform recording the historical print activity of a plurality of users associated with a group and communicating the historical print activity to the print driver which is configured to provide an active user recommended selectable printer settings for a print job, prior to being submitted, which are based on best practices within the group.

18 Claims, 8 Drawing Sheets

(56) References Cited

U.S. PATENT DOCUMENTS

| | | | |
|---|---|---|---|
| 7,970,780 | B2 | 6/2011 | Hirahara |
| 8,009,921 | B2 | 8/2011 | Csurka |
| 8,111,923 | B2 | 2/2012 | Csurka et al. |
| 8,117,617 | B2 | 2/2012 | Fernstrom et al. |
| 8,125,657 | B2 | 2/2012 | Kato |
| 8,145,073 | B2 | 3/2012 | Bouchard et al. |
| 8,150,858 | B2 | 4/2012 | Perronnin et al. |
| 8,165,410 | B2 | 4/2012 | Perronnin |
| 8,165,974 | B2 | 4/2012 | Privault et al. |
| 8,171,049 | B2 | 5/2012 | Ah-Pine et al. |
| 8,175,376 | B2 | 5/2012 | Marchesotti et al. |
| 8,180,642 | B2 | 5/2012 | Bouchard et al. |
| 8,230,248 | B2 | 7/2012 | Dance et al. |
| 8,249,343 | B2 | 8/2012 | Perronnin et al. |
| 8,280,828 | B2 | 10/2012 | Perronnin et al. |
| 8,344,854 | B2 | 1/2013 | Shrader |
| 8,369,449 | B2 | 2/2013 | Seyedi-Esfahani |
| 8,370,338 | B2 | 2/2013 | Gordo et al. |
| 8,380,647 | B2 | 2/2013 | Perronnin et al. |
| 8,384,941 | B2 | 2/2013 | Ciriza et al. |
| 8,386,437 | B2 | 2/2013 | Monet et al. |
| 8,400,661 | B2 | 3/2013 | Grasso et al. |
| 8,441,668 | B2 | 5/2013 | Shrader et al. |
| 8,447,767 | B2 | 5/2013 | Ah-Pine et al. |
| 8,463,051 | B2 | 6/2013 | Perronnin et al. |
| 8,488,150 | B2 | 7/2013 | Dietrich et al. |
| 8,503,016 | B2 | 8/2013 | Grasso et al. |
| 8,532,399 | B2 | 9/2013 | Perronnin et al. |
| 8,593,670 | B2 | 11/2013 | Meunier et al. |
| 8,619,304 | B2 | 12/2013 | Lombardo et al. |
| 8,625,130 | B2 | 1/2014 | DeRoller |
| 8,644,622 | B2 | 2/2014 | Perronnin et al. |
| 8,670,140 | B2 | 3/2014 | Bellotti et al. |
| 8,731,317 | B2 | 5/2014 | Sanchez et al. |
| 8,774,498 | B2 | 7/2014 | de Campos et al. |
| 8,775,154 | B2 | 7/2014 | Clinchant et al. |
| 8,775,424 | B2 | 7/2014 | Skaff et al. |
| 8,848,242 | B2 | 9/2014 | Roy et al. |
| 8,879,103 | B2 | 11/2014 | Willamowski |
| 8,902,450 | B2 | 12/2014 | Scrafford et al. |
| 2008/0005195 | A1 | 1/2008 | Li |
| 2008/0240572 | A1 | 10/2008 | Hoshii |
| 2008/0273224 | A1 | 11/2008 | Maulsby et al. |
| 2008/0288366 | A1 | 11/2008 | Schonbucher et al. |
| 2008/0297830 | A1 | 12/2008 | Sewell et al. |
| 2009/0059279 | A1 | 3/2009 | Sakurai |
| 2009/0094528 | A1 | 4/2009 | Gray et al. |
| 2010/0082615 | A1 | 4/2010 | Clinchant et al. |
| 2010/0274599 | A1 | 10/2010 | DeRoller |
| 2011/0052063 | A1 | 3/2011 | McAuley et al. |
| 2011/0137898 | A1 | 6/2011 | Gordo et al. |
| 2011/0141511 | A1 | 6/2011 | Milanski et al. |
| 2013/0346172 | A1 | 12/2013 | Wu |
| 2014/0180651 | A1 | 6/2014 | Lysak et al. |

OTHER PUBLICATIONS

Carbonetto et al., "A Statistical Model for General Contextual Object Recognition," in ECCV, 2004, pp. 2-13.

U.S. Appl. No. 14/228,489, filed Mar. 28, 2014, Malik et al.

Coulter et al., BMRB Social Research and Glenn Lyons, Tim Chatterton and Charles Musselwhite, Centre for Transport & Society and the Air Quality Management Resource Centre, University of the West of England. "Exploring public attitudes to personal carbon dioxide emission information," Sep. 2007, pp. 1-57.

Csurka et al., "Visual Categorization with Bags of Key-points," in ECCV Workshop on Statistical Learning for Computer Vision, 2004, 16 pages.

Darby, S. "Why, what, when, how, where and who? Developing UK policy on metering, billing and energy display devices," in Proc. ACEEE Summer Study on Energy Efficiency in Buildings, Asilomar, CA, Aug. 17-22, 2008.

Grasso et al., "Who Can Claim Complete Abstinence From Peeking At Print Jobs?", proceedings of CSCW 2002, pp. 296-305, ACM Press.

Grasso et al., "The Personal Assessment Tool: A System Learning Communities of Users of Shared Printers for Providing Environmental Feedback", ICMLA Conference 2010, pp. 704-709.

Hofmann. "Unsupervised learning by probabilistic latent semantic analysis" Machine Learning, 2001,42(1/2):177-196.

Lee. "Algorithms for nonnegative matrix factorization" Advances in Neural Information Processing Systems, 2001, 13:556-562.

O'Neill et al. "When a little knowledge isn't a dangerous thing" Conf. on Human Factors in Computing Systems, May 7-12, 2011, pp. 1-10.

Lowe. "Distinctive image features from scale-invariant keypoints", IJCV, vol. 60, 2004, pp. 1-28.

Perronnin et al. "Fisher kernels on visual vocabularies for image categorization" CVPR 2007, pp. 1-8.

Perronnin et al. "Improving the fisher kernel for large-scale image classification", Proc. $11^{th}$ European Conf. on Computer Vision, Part IV, 2010, pp. 143-156.

Perronnin et al. "Large-scale image retrieval with compressed fisher vectors", Proc. of Computer Vision and Pattern Recognition, 2010, pp. 3384-3391.

Quelhas et al., "Modeling Scenes with Local Descriptors and Latent Aspects," in ICCV, 2005, pp. 1-8.

Salton, G. "Development in Automatic Text Retrieval", Science, 253, pp. 974-979.

Sanchez et al. "High-dimensional signature compression for large-scale image classification" CVPR 2011, pp. 1665-1672.

Van der Aalst, "Process Mining. Discovery, Conformance and Enhancement of Business Processes", Springer and Verlag, 2011, 10 pages.

Willamowski et al. "The personal assessment tool: an experiment" Intl. Congress on Environmental Modeling and Software, Jul. 1-5, 2012, pp. 1-8.

Autobloggreen, http://www.autobloggreen.com/2008/10/29/ford-smart-gauge-collects-green-leaves-for-good-behavior/, accessed Jul. 7, 2010.

Conservatree: http://conservatree.org/, accessed Jul. 7, 2010.

EcoButton: http://www.eco-button.com/uk/A2.1.home.htm, accessed Jul. 7, 2010.

Equitrac: http://www.equitrac.com/, accessed Jul. 7, 2010.

GreenPrint: http://www.printgreener.com/earthday.html, accessed Jul. 7, 2010.

Honda Insight EcoAssist Nags Like a Backseat Hippie, Demo: http://automobiles.honda.com/insighthybrid/fuel-efficiency.aspx, accessed Jul. 7, 2010.

Honda Insight EcoAssist Unifies Driver and Automobile for ONe Goal-Enhancing Efficiency-Demo: http://autuomobiles.honda.com/insight-hybrid/fuel-efficiency.aspx, accessed Jul. 7, 2010.

Ipsos study for Lexmark: Lexmark Paper Waste Press Releases— "Retail Top European League of Paper Wasters" May 22, 2006, Lexmark International, Inc. http://www.lexmark.com/uncompli-cated/pressrelease/home/0,7071,295522_2483_730688098_en,00.

Preo Printelligence: http:///www.preosoftware.com/printelligence/solution.html, accessed Jul. 7, 2010.

PrintAudit: http://www.printaudit.com, accessed Jul. 7, 2010.

Sol Echanger Autrement—www.sol-reseau.org , (English translation of web page, accessed Jul. 7, 2010.

US Environmental Protection Agency, accessed Jul. 7, 2010, http://www.epa.gov/otaq/climate/420f05004.htm#step1.

Watchdoc—www.doxense.com/, accessed Jul. 7, 2010.

\* cited by examiner

METHOD AND SYSTEM FOR MUTUAL AUGMENTATION OF A MOTIVATIONAL PRINTING AWARENESS PLATFORM AND RECOMMENDATION-ENABLED PRINTING DRIVERS

BACKGROUND

This disclosure provides a method and system to promote the reduction of an environmental impact by one or more users of a printing system. According to an exemplary embodiment, a printing system includes a motivational platform and an operatively associated printer driver, the motivational platform recording the historical print activity of a plurality of users associated with a group and communicating the historical print activity to the print driver which is configured to provide an active user recommended selectable printer settings for a print job, prior to being submitted, which are based on best practices within the group.

To face ongoing global warming issues and in general to promote sustainable development, a number of tools have been developed that help people to assess the impact of their behavior. These tools are often referred to as carbon dioxide calculators. They collect input, either automatically or from the user, and provide a measure of how much certain behaviors affect the environment, by translating those habits into corresponding units like carbon dioxide and energy consumption levels. Such tools are becoming widespread and their overall aim is in providing awareness and ultimately changing the user's behavior to reduce the impact on the environment.

Despite their simple mechanism, these tools are very challenging to design in such a way that they provide sufficient incentive to change the user's habits and use of resources. This is because even if there is a benefit to a cleaner environment, not many are prepared to voluntarily reduce their carbon footprint by changing their habits. This phenomenon is known as a social dilemma wherein on one hand each individual is pushed to exploit the resource to his advantage as much as possible. On the other hand, if everyone behaves in an exploitative manner the resource will be damaged to the detriment of all. The dilemma is to either take the selfish short term stake or to contribute to the longer term common good.

Social pressure can be one way to influence the individual's choice. Surveys of office workers have found that social pressure can affect the use of certain printing resources (e.g., color devices) by reducing their use to only when strictly necessary. Several conventional devices are currently available to track personal resource usage within an office environment. One product, Green Print, tracks resource usage in view of environmental concerns. GreenPrint is installed as an application on a user's computer to assist him/her to print less through suggesting several options that in one way or another reduce the total amount of printed pages. The system also provides statistics in terms of carbon dioxide, pages and "trees" about the obtained savings. This data provides rather simple measurements related to savings, which are compared only to what is available to print in view of what is ultimately sent to a printer. There is no comparison to any other standards such as a user's historical data or other users. Accordingly, it can be unclear how the behavior can be modified (e.g., both positively and negatively) to promote further action.

INCORPORATION BY REFERENCE

U.S. Pat. No. 8,879,103, issued Nov. 4, 2014, by Willamowski et al., entitled "SYSTEM AND METHOD FOR HIGHLIGHTING BARRIERS TO REDUCING PAPER USAGE";

U.S. Pat. No. 8,503,016, issued Aug. 6, 2013, by Grasso et al., entitled "SYSTEM AND METHOD FOR PROVIDING ENVIRONMENTAL FEEDBACK TO USERS OF SHARED PRINTERS";

U.S. Pat. No. 8,400,661, issued Mar. 19, 2013, by Grasso et al., entitled "VIRTUAL PRINTING CURRENCY FOR PROMOTING ENVIRONMENTAL BEHAVIOR OF DEVICE USERS";

U.S. Pat. No. 8,848,242, issued Sep. 30, 2014, by Roy et al. entitled "SYSTEM AND METHOD TO IMPLEMENT SHARING OF PAPER DOCUMENTS USING VIRTUAL CURRENCY";

U.S. Pat. No. 8,384,941, issued Feb. 26, 2013, by Ciriza et al., entitled "SYSTEM AND METHOD FOR ENABLING AN ENVIRONMENTALLY INFORMED PRINTER CHOICE AT JOB SUBMISSION TIME";

GRASSO et al., "THE PERSONAL ASSESSMENT TOOL: A SYSTEM LEARNING COMMUNITIES OF USERS OF SHARED PRINTERS FOR PROVIDING ENVIRONMENTAL FEEDBACK", ICMLA Conference 2010, pages 704-709, are incorporated herein by reference in their entirety.

BRIEF DESCRIPTION

In one embodiment of this disclosure, described is a computer-implemented method of operating a printing system to promote the reduction of an environmental impact by a user of the printing system, the printing system including one or more printing devices, one or more user devices operatively associated with the printing devices, one or more print drivers operatively associated with the one or more printing devices and the one or more user devices, each print driver configured to provide to a user device one or more available user selectable printer settings and one or more recommended user selectable printer settings associated with printing the print job, and a motivational platform operatively associated with the one or more printing devices and the one or more print drivers, the motivational platform configured to record and communicate to the one or more printer devices a printing activity of the one or more users and the one or more user selectable printer settings associated with the historical printing activity, the method comprising: a) one of the user devices providing a print job to the print driver to be printed by one of the printing devices; b) the print driver providing the one or more available user selectable printer settings for display to the user on a display associated with the user device and the one or more recommended user selectable printer settings associated with the print job, the one or more recommended user selectable printer settings originating from the motivational platform and associated with one or both of the historical printing activity of the user and a historical printing activity of one or more other users of the printing system; c) the user configuring the one or more printer settings for printing the print job; d) the print driver communicating the print job and user configured one or more printer settings to the printing device; e) the print driver communicating to the motivational platform information associated with the print job communicated to the printing device, the information including a user identifier, a print job identifier, the one or more recommended user selectable printer settings, and the one or more user configured printer settings; and f) the motivational platform storing the communicated information associated with the print job.

In another embodiment of this disclosure, described is a system to promote the reduction of an environmental impact by one or more users of an associated printing system, the system comprising: printing device data including information related to a print job sent to a printing device by an active user; community data including information related to historical printing activity by members of a community including the one or more users of the associated printing system; a motivational platform component including a profiling component configured to receive the printing device data and the community data, and configured to evaluate historical printing activity by the active user compared to historical printing activity of one or more other users within the community; and a printer driver component configured to receive printer settings from the profiling component based on the evaluation, generate one or more recommended user selectable printer settings based on the received printer settings from the profiling component and graphically display the recommended user selectable printer settings to the active user prior to the active user initiating a submission of the print job to the printing device.

DETAILED DESCRIPTION

As previously described, within the domain of printing systems, motivational platforms can be provided to increase users' awareness of their printing habits. In addition, printing systems may also include various 'smart' printing drivers, i.e., print drivers with recommendations or help features that are configured to reduce an environmental impact.

Now is described a method and system for augmenting the capabilities of both environmentally smart printing drivers and motivational platforms by creating a synergy between these two domains.

The embodiments herein can help users to achieve optimal use of resources in two ways. First, motivational platform systems and methods herein track print usage and identify areas where there is room for improvement. Second, the exemplary embodiments compare personal behavior with the behavior of colleagues and overall organizational goals to motivate users to improve their behavior. To promote the personal optimization of resource use, the present embodiments extend the notion of social pressure to the personal desktop environment. A shared physical environment can exert social pressure to optimize the use of common resources through the overseeing of the activities of colleagues, such as shared use of a printer. Showing how the personal use of a shared printer compares with the one of colleagues using the same printer can motivate the individual to change his/her behavior and to optimize it. It can also promote best practices within a group, if appropriate information is provided and associated to print actions of colleagues.

In addition to the use of a motivational platform, a smart print driver system and method including recommendations to a user is provided for enabling a user of a printer network to make an environmentally informed printer choice for a print job. In the exemplary embodiment, printer status information and an indication of the environmental cost of choosing various printers is made available to the user when the user selects an object for printing.

Finally, provided is a method and system which integrates a motivational platform and a recommendation-enabled print drive, i.e., smart driver, which enables the augmentation or both the motivational platform and recommendation-enabled print driver.

The term "device" or "printer," as used herein, broadly encompasses various printers, copiers, bookmaking machines, or multifunction machines, xerographic or otherwise, unless otherwise defined, which performs a print job rendering function for any purpose.

A "printer network," as used herein incorporates a plurality of shared devices, which are accessible to one or more workstations, such as personal computers.

The term "print medium" generally refers to a physical sheet of paper, plastic, or other suitable physical print media substrate for images, whether precut or web fed.

A "print job" generally includes a "printing object," which consists of one or more document images in a suitable format that is recognized by the printer, e.g., Postscript, together with a "job ticket," which provides information about the print job that will be used to control how the job is processed.

Figure 1:
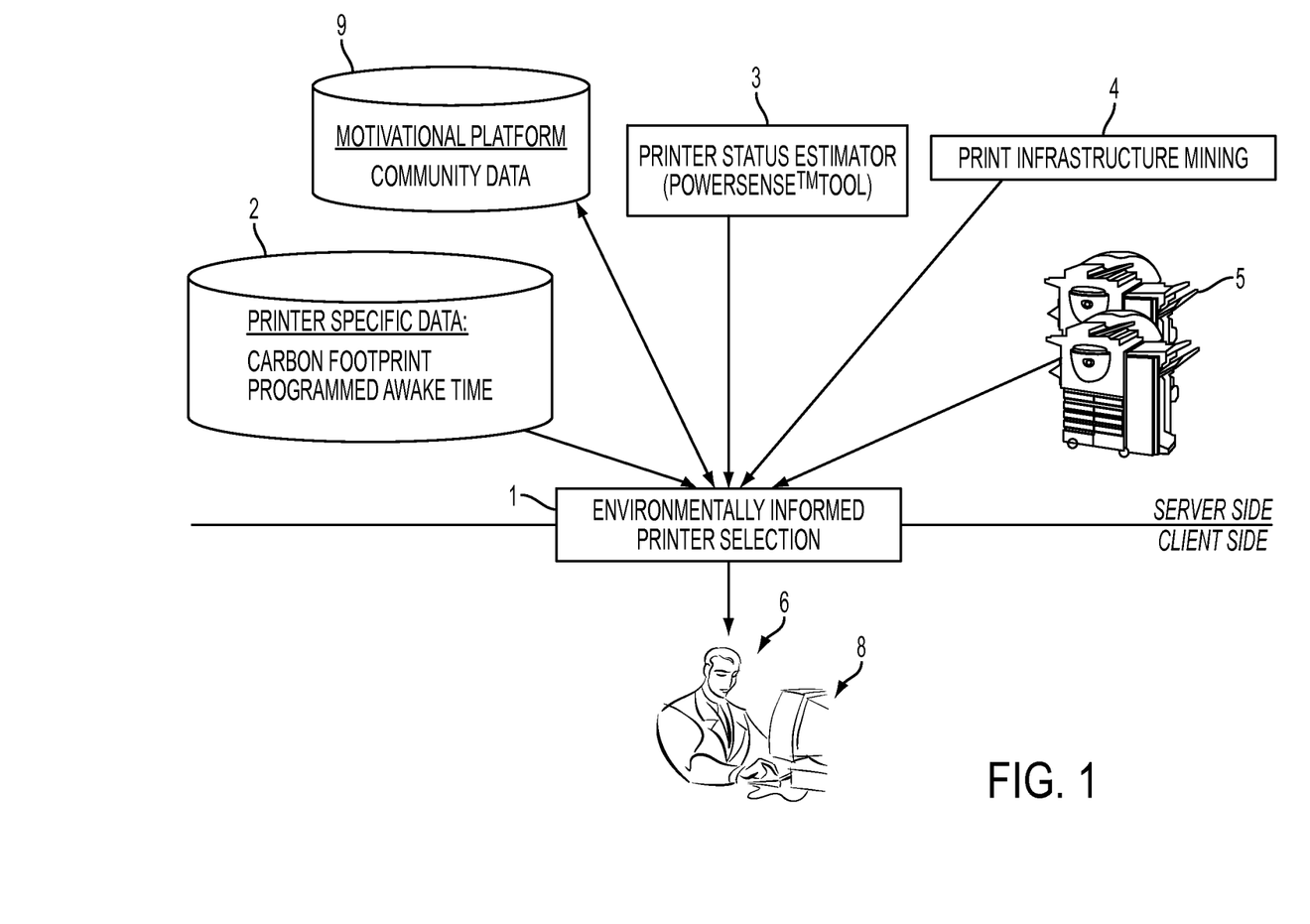
FIG. 1 is a schematic view of an environmentally informed printer selection system.

With reference to FIG. 1, a simplified view of an exemplary printing environment is illustrated which hosts a system 1 for an environmentally informed printer selection. The system 1 has access to printer-specific data 2, as well as tools 3, 4, for determining the future status of available printers 5 and for mining printer usage date to identify a set of printers favored by a user 6. In addition, as will be further described below, a motivational platform is operatively associated with the print driver 1, where the motivational platform compiles community data associated with the printing of print jobs for display by workstation 8, and records user printing behavior relative to following environmental recommendations provided by print driver 1.

The system 1 provides the user with printer-related information. The information may be made available permanently and/or when he is about to launch a print job. The information is made available to the user through a graphical user interface, e.g., on his workstation 8, for example, using readily understood icons and other graphical representations.

The information provided to the user about the available printers may include their: 1. Current status (e.g., awake/asleep) 2. Foreseen status (e.g., will wake up at an expected future time) 3. Carbon footprint (e.g., currently, and in optimal status)

The carbon footprint, i.e., environmental cost, of a print job is a measure, either actual or approximate, of the impact that a print job will have on the environment in terms of the amount of greenhouse gases produced, which may be measured in units of carbon dioxide. The environmental cost may be determined as a function of the type of printer selected for the print job, its current status, and optionally also parameters of the print job, where, for example, double sided printing uses less paper and thus may be assigned a lower contribution to the print job's environmental cost.

The environmental cost may be, for example, an estimate of all costs associated with printing a print job or an add-on cost computed by subtracting a baseline cost for printing the job at the lowest environmental cost available to the user, which is thus assigned a zero cost. In one embodiment, each operational printer may be assigned a per-page environmental cost for each of a set of states, where the "awake" state is assigned the lowest environmental cost and the "asleep" state is assigned higher environmental cost which is equivalent to the awake cost plus a waking-up cost.

To allow the user to take into account personal constraints and preferences, such as with respect to time (e.g., how urgent is the job), location (e.g., will the user have to waste too much time walking to the printer to pick up the job), and financial cost (e.g., if the job is a draft, the cost of printing on a high quality printer may not be justified), the system 1 may be enhanced with corresponding complementary information which allows the user to take into account these personal constraints and preferences, such as: 1. The current size of the print queue (allowing the user to estimate the print delay) 2. Possible problems on the printer requiring attention (more or less serious, from: paper jam to scheduled repair) 3. The location (proximity to the user/usual printer) 4. The financial cost of printing (which is determined using different parameters to the environmental cost)

Providing this information together, though a single interface, provides the user with the relevant information about the possible printers on which to make an informed choice of printer selection when submitting his job. In addition, other information provided by a motivational platform can be included with the print drive selections, including best practices of a user's printing community, as is now described with reference to FIG. 2.

Figure 2:
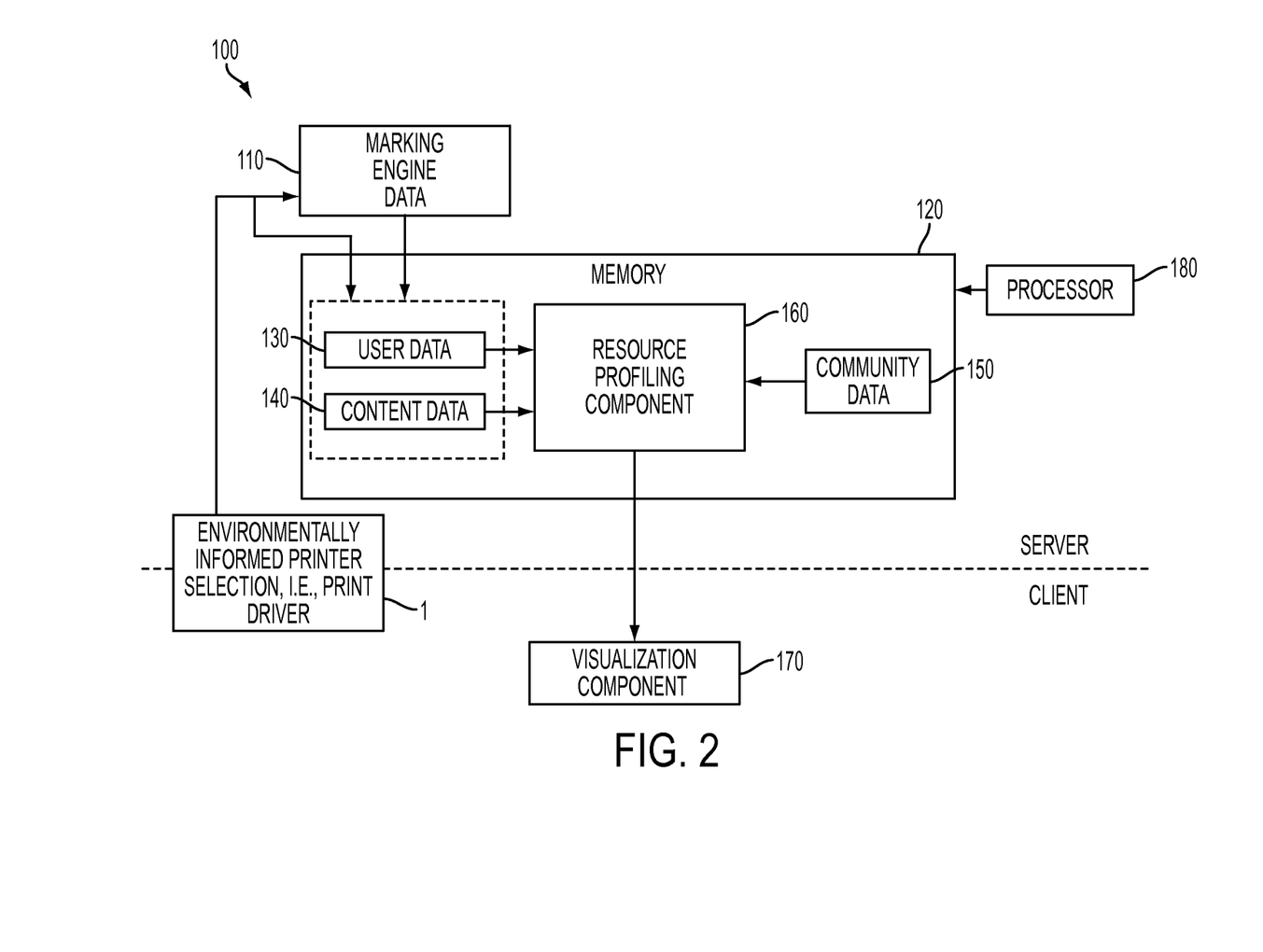
FIG. 2 illustrates a system that generates graphics based on information from a resource profiling component, in association with an exemplary embodiment.

FIG. 2 illustrates a system 100 that analyzes marking engine data 110 relative to predetermined usage metrics, referred to as a motivational platform. This data generated from this analysis is displayed via a visualization component 170. The system 100 includes a processor 180 that executes and a memory 120 that stores computer executable instructions and/or computer readable data for performing various techniques and/or methods associated with a motivational platform as described herein. The memory 120 may be a computer readable recording medium on which a control program is recorded, such as a disk, hard drive, or the like. Common forms of computer-readable media include, for example, floppy disks, flexible disks, hard disks, magnetic tape or any other magnetic storage medium, CD-ROM, DVD or any other optical medium, a ROM, a PROM, an EPROM, a flash EPROM, or other memory chip or cartridge, or any other tangible medium form which a computer can read and use. Alternatively, the method may be implemented in a transmittable carrier wave in which the control program is embodied as a data signal using transmission media, such as acoustic or light waves, such as those generated during radio wave and infrared data communications, and the like.

The system 100 receives marking engine data 110, compares it to one or more metrics to determine the amount of resources utilized, and generates a visualization component 170 based on this comparison. The marking engine data 110 can be generated by a user via a marking engine such as a printer, a multi-function machine, a fax machine, or any other device that marks a substrate. In one example, a user can send information from a word processing application on a computer which is connected to a printer. The word processing application can be utilized to specify the type of content (e.g. color, black and white, etc.), number of pages, the location of the printing, etc. The marking engine data 110 can be gleaned from the marking engine after each print job is sent from a computer.

The marking engine data 110 can include information related to any number of aspects of a print job. This information can be contained in substantially any standard protocol utilized for the conveyance of marking engine information. In one example, the marking engine data 110 includes the user's name, the print device, the number of pages, the type of content and the type of ink used. The marking engine data 110 is transferred to the memory component 120 where it is parsed via a user data component 130 and a content data component 140 for consumption via a resource profiling component 160.

The user data component 130 extracts user information from the marking engine data 110 and Print Driver 1 that can include information relevant to the user that originated a print job sent to a marking engine, as well as recommended print configuration from the print driver, which could be based on environmental recommendations and/or best practices of the user's community. For example, user information can be extracted that includes the name of the user that sent the print job, the location of the user, or any other information specific to the identity of the originator of the print job. The content data component 140 extracts information from the marking engine data 110 related to the content of the print job. This includes the orientation of the print job, whether the printing is duplex or simplex, the type of ink specified (e.g., CMYK, black and white, etc.), whether any images are required, and/or any information related to the resources utilized by the marking engine to perform the print job.

In addition to the user data 130 and the content data 140, the resource profiling component 160 receives community data 150 that is representative of resource usage by one or more users within the same community as the user associated with the marking engine data 110. The community data 150 can be utilized by the resource profiling component 160 to compare the user's resource usage to others within the same community. In one example, a community includes peers of the user that are defined by one or more of a geographic location, a job title, a department, a job function, etc. For instance, a user within an engineering group of a corporation may restrict their printing to black and white documents (e.g., for manuals, specifications, schematics, etc.). In contrast, a user within an advertising/marketing department of a corporation can be involved in the creation and production of vivid multi-color documents for the creation of brochures that include, for example, images and/or other graphics that require a greater and more diverse ink set for their creation. Accordingly, data from the users within the same community is received by the resource profiling component 160 for comparative purposes. In one approach, the resource profiling component 160 includes a memory (not shown) to aggregate a user's resource usage over a period of time. Such usage can then be compared to others within their community over a predetermined time period.

The user data 130, the content data 140, and the community data 150 are received, aggregated and compared to one or more predetermined metrics by the resource profiling component 160. This information is then sent to a visualization component 170 to generate a graphic that is representative of such comparison. Information can be sent within a client/server architecture, wherein the resource profiling component 160 is on a server side and the visualization component 170 receives this information on a client side. It is to be appreciated that the visualization component 170 is representative of one or more such components that can be distributed throughout a network.

The graphic generated by the visualization component 170 can be indicative of how successful a user is in meeting or exceeding predetermined expectations with regard to their resource usage. A graphic can have several iteration levels that are each representative of resource usage within a continuum. For example, five iterations can be employed wherein a first iteration is representative of resource usage well below a benchmark (e.g., indicative of a low level of resource use) whereas a fifth iteration can be representative of resource usage that is well above the benchmark (e.g., indicative of a high level of resource use).

The graphic generated by the visualization component 170 can be output to a server or other distribution means within a computer network and ultimately displayed on a display utilized by the user and/or one or more other designated personnel. The generation of the graphic at these destinations can facilitate behavior modification wherein the user is cognizant of their resource usage and whether they are meeting the predetermined resource usage objectives. If, for example, the graphic is moving toward the fourth or fifth iteration of the display, the user can be aware that their usage is outside an acceptable level. In this manner, they can modify their behavior to utilize a lower amount of resources in order to stay within the predetermined benchmarks.

In one example, the user can substitute simplex for duplex printing, color for black and white printing, lower quality stock for higher quality stock, and other choices that will limit resource usage, and therefore environmental impact, caused by their behavior. In addition to the graphic, the visualization component 170 can provide suggestions to the user to help them achieve usage within or below the predetermined benchmarks. Thus, the system 100 is a closed-loop behavior modification system that allows a user to cognizant of their resource usage. Usage behavior can be modified wherein results of their modified behavior is presented to the user on an ongoing basis.

Figure 3:
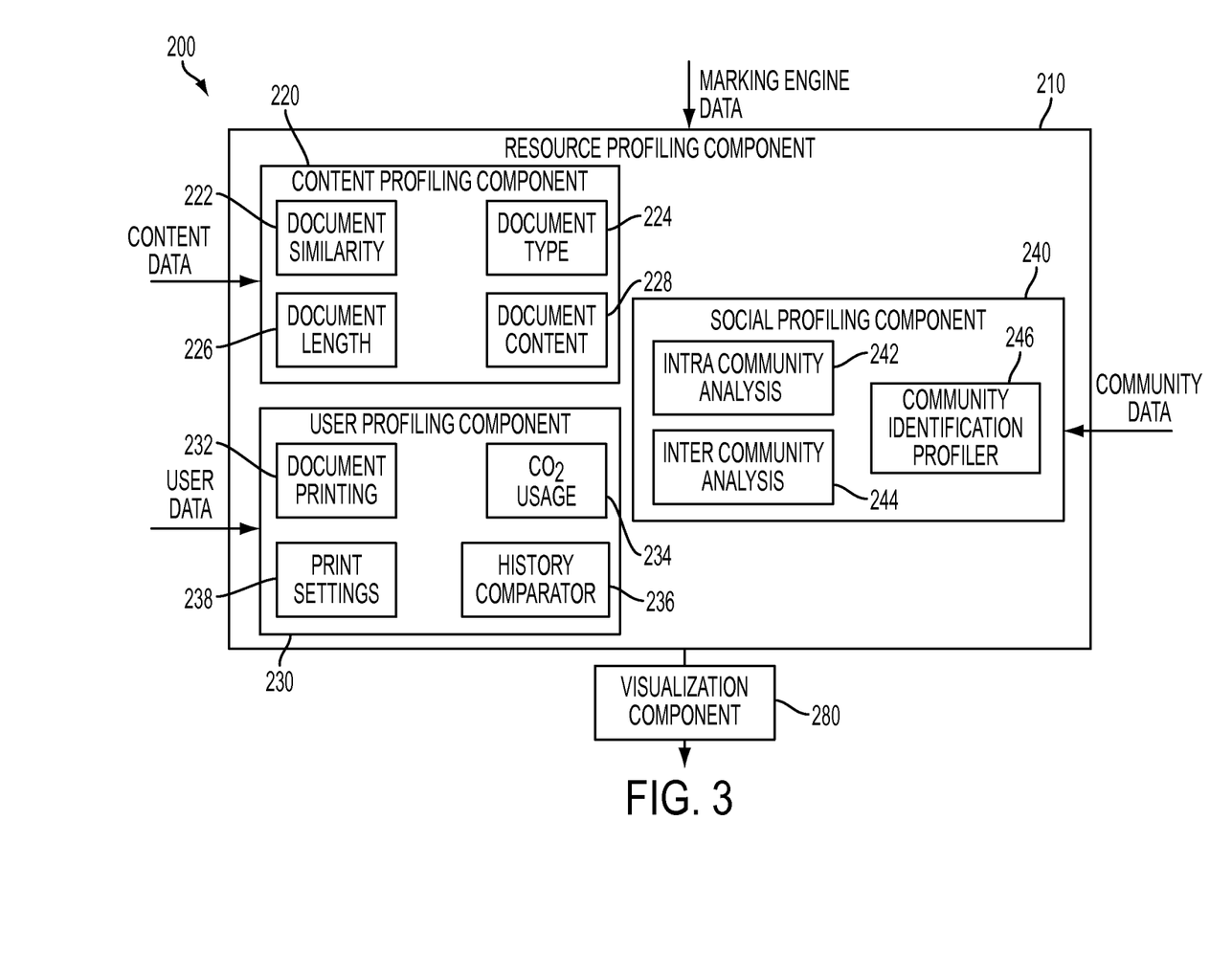
FIG. 3 illustrates a detailed view of a resource profiling component, in association with an exemplary embodiment.

FIG. 3 illustrates a system 200 utilized to receive content data, user data, and community data, perform analysis thereof as it relates to resource usage, and generate one or more graphics commensurate therewith to facilitate behavior modification of a user. A resource profiling component 210 (similar to the resource profiling component 160 of FIG. 2) includes a content profiling component 220, a user profiling component 230, and a social profiling component 240 to receive the content data, the user data, and the community data respectively. Each of these three components contains several subcomponents that are utilized to perform specific analysis with regard to disparate aspects of resource usage. This analysis and resulting information is output to a visualization component 280, which renders the graphic onto a display such as a computer monitor or similar output device.

The content profiling component 220 receives content data from an outside source. More particularly, the data can be marking engine data from a marking engine such as a printer or equivalent device. The content data can be extracted from a data stream either during pre or post data processing for a print job. The content profiling component 220 evaluates a plurality of aspects of content from a print job including a document similarity 222, a document type 224, a document length 226 and a document content 228. The document similarity 222 can evaluate the current print job content in view of previous print job content to identify any differences in each print job and/or to identify trending associated therewith. For example, the document similarity 222 can be used to identify whether a document associated with a current print job is a version of a previous one, a duplicate, or a new instance. In one example, a term frequency-inverse document frequency (TF-IDF) weight can be associated with the current print job to profile the current document and identify if the document is a new document, a previous document, or related to another document.

The document type 224 can be utilized to identify the purpose for which the document is printed, such as a type of communication including an email, a letter, etc. Other document types can be related to substantive documents such as white papers, informational essays, etc. that are unrelated to communication between two parties. In one example, a label associated with a communication between parties can be labeled as transient whereas a substantive document can be labeled as non-transient. Another instance of a transient label can occur when a document is very similar to one or more previous documents. This similarity can indicate that the previous documents are drafts and therefore transient.

Any number of document types can be defined and recognized by the content profiling component 220. Each document type can require inclusion of one or more parameters such as content, similarity to other documents, functionality, etc. Alternatively or in addition, a priority level can be associated with each document type. The priority level associated with each document type can be retrieved from a from lookup table or similar storage means and updated as needed. For example, a transient document type can have a lower priority level than a non-transient document type. The priority level can be used as one of many factors to calculate resource usage for each user. For instance, usage (e.g., printing) associated with non-transient document types can be weighted less heavily than usage associated with transient type documents. Disparity in priority can be related to the importance of using resources to generate a hardcopy of the document.

The document length 226 can include the length of content within each document. The document length 226 can be evaluated to determine if a user is following standardized trending associated with previous print jobs or if the current print job is outside of such established norms. For example, if the document length 226 deviates from an average length for a particular user, the resource usage associated with such user can be weighted more heavily than a user that consistently produces longer document lengths. Thus, documents that are longer than normal can be commensurate with greater resource usage and those that are shorter than normal can be associated with lesser resource usage. As discussed, the norm can be determined in view of a user's past usage and/or usage within the same community.

The document content 228 can include the type and format of information within a document such as text, images, decorations, graphics, and/or color within each document. Inclusion of certain types of content can cause a greater amount of resource usage. For example, documents with a high percentage of text and a relatively low percentage of images can utilize a low amount of resources to produce. In contrast, documents that include rich color content including graphics, images and/or colored text can be associated with a high resource usage. It is to be appreciated that any number of metrics and/or categories can be employed to describe the content within a document including percentage of certain content types (e.g., images).

The user profiling component 230 receives user data that can be extracted from the marking engine data as discussed above in FIG. 2. The user profiling component 230 first identifies the user associated with a print job and evaluates the activities of the user identified via a document printing component 232 a $CO_2$ usage component 234, a history comparator 236, and a print settings component 238. The document printing component 232 can identify the types of documents associated with the user including transient documents, final versions, a plurality of copies of one document, etc. Such information can associate a user with a particular baseline wherein past resource usage can be indicative of thresholds for future usage.

The $CO_2$ usage component 234 can quantify the amount of carbon dioxide associated with a user's resource usage. Each printed page can be associated with a certain level of $CO_2$. The level can be specific to the content identified via the document content component 228, in one example. For example, printing one page with five percent coverage of color text can correspond to 10 g of $CO_2$ expended for power generation, etc. Each time a print job is sent, the $CO_2$ usage component 234 can calculate the $CO_2$ used and add it to a running total usage value. In this manner, a normalized quantity can be presented to a user in an environmentally meaningful context.

The print settings component 238 can identify settings that lead to inefficient resource usage. For example, one print setting can relate to large margins that serve to increase document length unnecessarily. Other settings can be identified by the print settings component 238 that cause resource inefficiencies such as pages with little or no text, use of a cover sheet, recto-verso, and/or a simplex or a duplex output. The print settings component 238 can communicate with a lookup table or similar means to receive a list of preferred printer settings, wherein current printer settings are compared thereto. The print settings component 238 can identify any differences between the preferred and current settings wherein such differences are reported to the usage analysis component.

The history comparator 236 compares a user's current activity to his or her past activity as it relates to resource usage. In this manner, trends and anomalies can be identified and analyzed to evaluate ways in which certain undesirable trends can be modified for each user wherein certain desirable trends can be reinforced. In addition, the history comparator 236 can attempt to mitigate the number of anomalies in data trending that can relate to inefficient resource usage. In this manner, a user can modify their behavior to trend towards desirable data metrics and away from undesirable data metrics within a printing environment. This information is output to the usage analysis component.

The social profiling component 240 receives community data in order to evaluate a user's resource usage within and outside a user's community. The social profiling component 240 includes an intra-community analysis component 242, an inter-community analysis component 244, and a community identification profiler 246. The community identification profiler 246 receives the community data which includes the resource usage of users within a plurality of potentially disparate communities. For example, the community data can represent the print activities of all employees within a corporation. The community identification profiler 246 groups the users within the community data into one or more communities as appropriate. The communities can be established based on one or more predetermined benchmarks for inclusion and exclusion within or outside of a community.

Such benchmarks can include the geographic location of the user, the title of the user, the past usage habits of a user, etc. For this purpose, a lookup table or other static memory component (not shown) can be used to cross-reference users from the community data in order to identify an appropriate community for placement. Other metrics that can be utilized by the community identification profiler 246 include users within a geographic location, users of the same print engine, users of the similar number of printed documents, similar type of printed documents, etc. This information can be gleaned from a memory store that collects resource usage habits over a predetermined period of time. Once the period is ended, the community identification profiler 246 can associate each user with a category, as appropriate.

Once the community identification profiler 246 has placed each user into a community, the intra-community analysis component 242 can evaluate a user's resource usage compared to others within the same community. For example, a user within a marketing department can be compared to other users within the marketing department of the same corporation. The intra-community analysis component 242 can quantify the behavior of each user to a particular benchmark for each community. In this manner, a measure can be associated with each user to identify users that are following predetermined benchmarks and those that are outside of such benchmarks. Moreover, this analysis over time can identify users which are consistently outside of a desired benchmark and those that have reformed their behavior to follow that of others within their community.

Similarly, the inter-community analysis component 244 can evaluate behavior of users within disparate communities to determine trending or other statistical information. This data can be employed to identify best practices from one community that could be used in other communities to facilitate an overall higher level of resource usage efficiency within every community identified. This information can also identify if one or more communities are consistently inefficient relative to other communities and if users within the community have reformed their behavior over time. For example, identical departments at different locations within a corporation can be compared to insure that all users within each community follow similar efficient resource usage practices.

A usage analysis component (not shown) can aggregate data from the content profiling component 220, the user profiling component 230 and the social profiling component 240 into a memory store in order to evaluate resource usage over a predetermined segment of time. Such resource usage within the memory store can be compared one or more benchmarks stored within a lookup table. Such benchmarks can include resource usage expected within each community and/or specific to each user within each community. This resource usage can be specific to the type of content expected, the length of documents, the types of documents printed, the print settings, the $CO_2$ usage, the frequency of printing, etc. for each user. The benchmarks within the lookup table can be created by review of previous resource usage practices to increase resource usage efficiency. Further, benchmarks within the lookup table can be modified over time in order to follow a "continuous improvement" paradigm until a larger resource usage goal is realized.

An evaluation component (not shown) can compare the usage within the memory store to the one or more benchmarks within the lookup table to determine how well each user is performing in view of such benchmarks. This evaluation can utilize substantially any measure to determine current and/or past resource usage to the benchmarks. A graphic selector receives information from the evaluation component to select a graphic that is representative of each user's current and/or overall resource usage. The graphic selector can utilize substantially any digitally created rendering that is displayed for consumption by each user within a system. In one example, the graphic selector utilizes renderings related to environmental concerns to illustrate the relative health of foliage within the environment such as a tree or similar vegetation. It is to be appreciated that any graphic is contemplated in substantially any number of iterations to depict various levels of resource usage.

A visualization component 280 receives renderings from a graphic selector and distributes such renderings to one or more output devices, such as a display. The renderings distributed can be sent at substantially any period of time such as upon request, over a predetermined period of time, on a continuous basis, etc. The visualization component 280 can identify output devices for distribution that are associated with one or more particular users. For this purpose, a network or other means of electronic communications media can be employed. In a further example, the visualization component 280 can allow a user to receive and install a widget for placement on a display such as a computer monitor. Such a widget can include settings for the display of information within the rendering on a content and/or time specific basis as desired.

Figure 4:
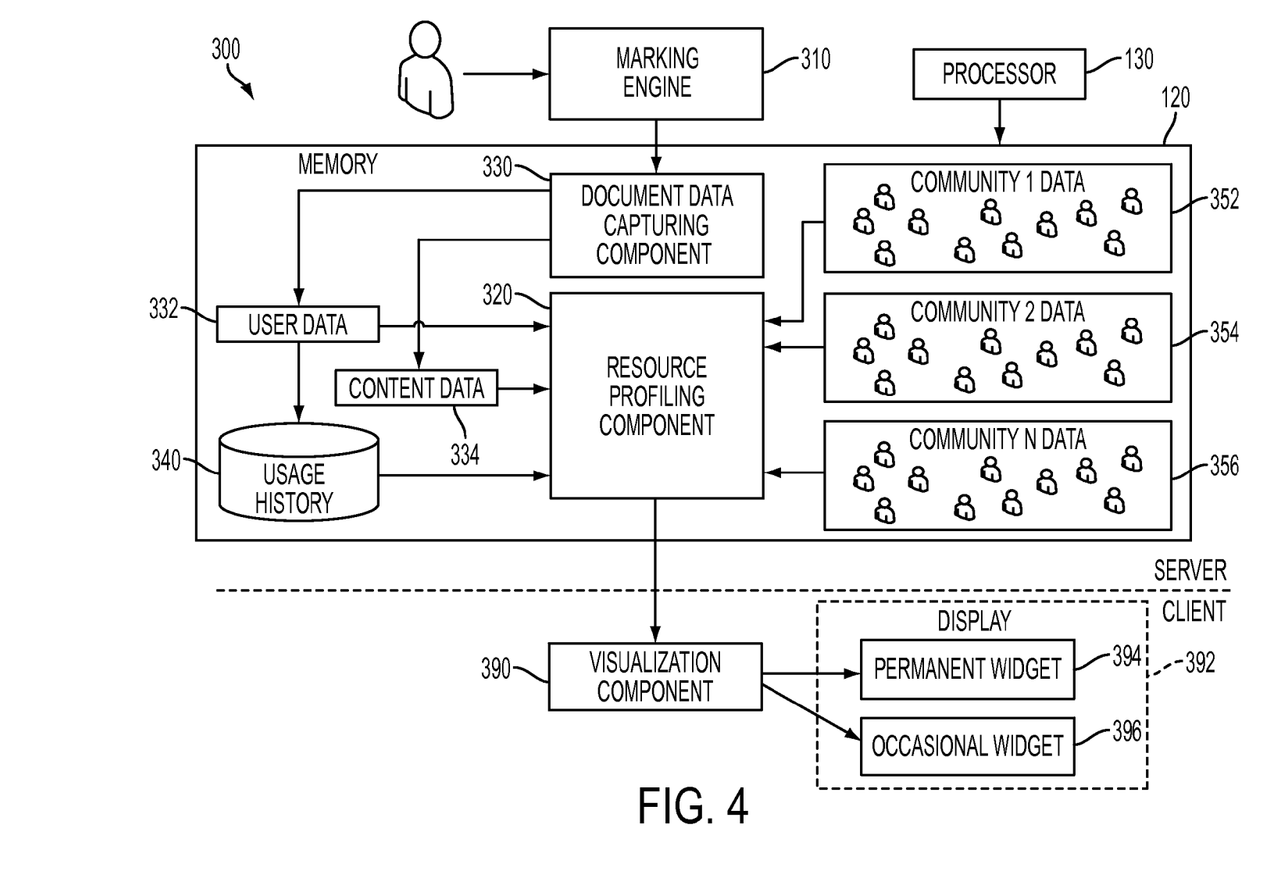
FIG. 4 illustrates a system that renders and outputs graphics via a permanent widget and an occasional widget on a display, in association with an exemplary embodiment.

FIG. 4 illustrates a system 300 utilized to analyze and provide an assessment of a user's resource usage. A marking engine 310 receives a print job generated by a user. The marking engine 310 can be substantially any device capable of placing content onto a substrate such as a printer, a multi-function machine, etc. A document data capturing component 330 captures information related to the print job from the marking engine 310 which is categorized into user data 332 and content data 334. The user data is further aggregated into a user's history component 340 to identify usage of resources by a user over a predetermined period of time. A resource profiling component 320 receives the user data 332, the content data 334 and usage history data 340.

The resource profiling component 320 evaluates this data in view of previous usage by a user (e.g., stored in the usage history component 340) and resource usage data for disparate users within any number of communities including a community 1 352, a community 2 354 up to a community N 356 wherein N is an integer greater than or equal to 3. The resource profiling component 320 evaluates the user data 332, the content data 334 and the community data 352, 354, 356 to identify resource usage associated with each user. This data is analyzed in view of other users within the same community and/or other communities and with regard to usage of the user themselves, as discussed with regard to FIG. 3 above.

Once the analysis is complete, information is output to a visualization component 390 that receives one or more renderings for distribution within the system 300. The visualization component 390 can distribute the renderings to a display 392. In this manner, a user can receive a visual representation of their resource usage that can act as a behavior modification tool to modify resource usage where appropriate. In one example, a permanent widget 394 is sent to a user to display a permanent rendering that is commensurate with a user's resource usage.

The permanent widget can provide a continuously updated graphic that can provide real time feedback to a user indicative of whether their resource usage is within or outside predetermined benchmarks. Similarly, an occasional widget 396 can be sent to a user (e.g., upon request after ten print jobs, etc.) to provide intermittent feedback to a user regarding their resource usage. In either case, a user receives feedback related to their activities within a printing environment to allow for decision making that will facilitate a more efficient use of resources.

Figure 5:
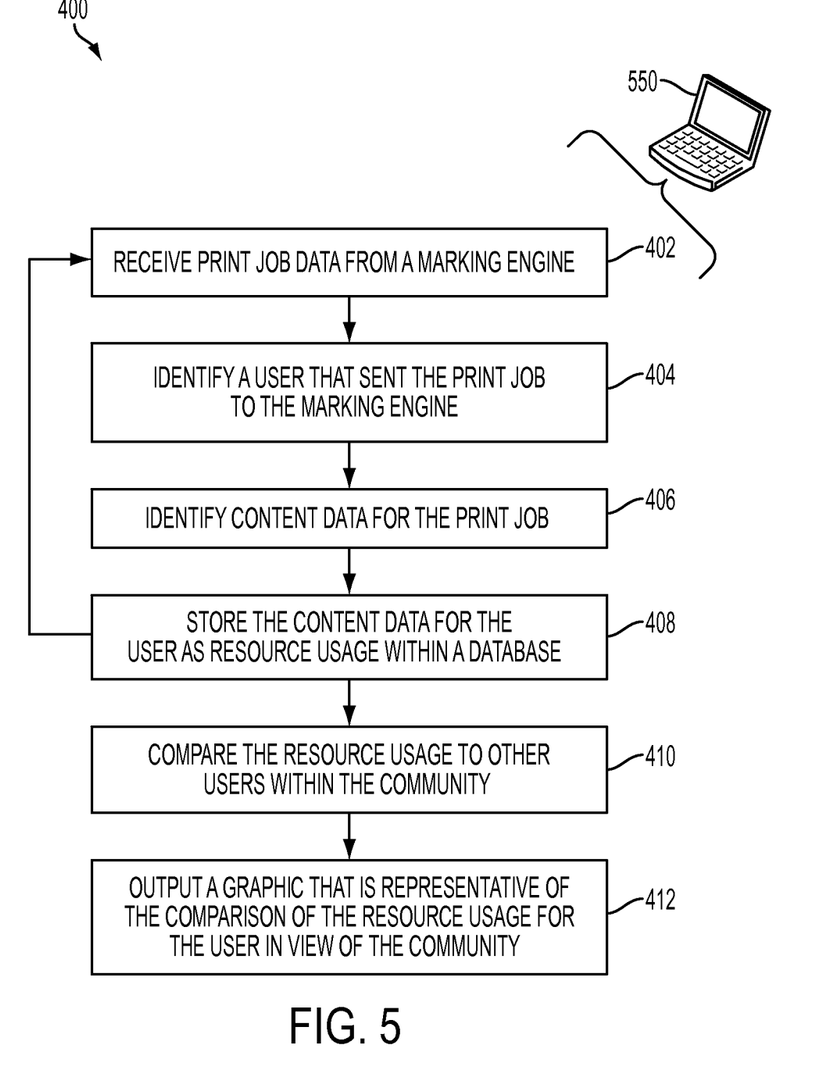
FIG. 5 illustrates a method to output a graphic representative of a user's resource usage, in association with an exemplary embodiment.

FIG. 5 illustrates a methodology 400, executed by a computer 550, utilized to output a graphic representative of resource usage of a user within a community. At reference numeral 402, print job data is received from a marking engine. Such print job data can include the user that originated the print job, the type of the content within the document, and print settings associated with the marking engine. At 404, a user that sent the print job to the marking engine is identified. At 406, content data for the print job is identified. In one example, the user and content data are extracted from the print job data after a print job has been executed. Content data can include the type of content such as text versus graphics and further include the manner in which content was printed such as via color or black and white ink.

At 408, content data for the user is stored as resource usage within a database. The storage of resource usage can facilitate comparison of a user's resource usage at 410 with other users within a community. Once the content data and user data are stored with a database at 408, the method returns to step 402 to receive further print job data from the marking engine. Once the resource usage for a user is compared to others within the community at 410, a graphic is output at 412 that is representative of the comparison of the resource usage for the user in view of the community. This graphic can provide feedback to a user that he/she is within or outside a predetermined benchmark. In one example, the graphic is related to an environmental context although substantially any thematic graphics are contemplated.

Figure 6:
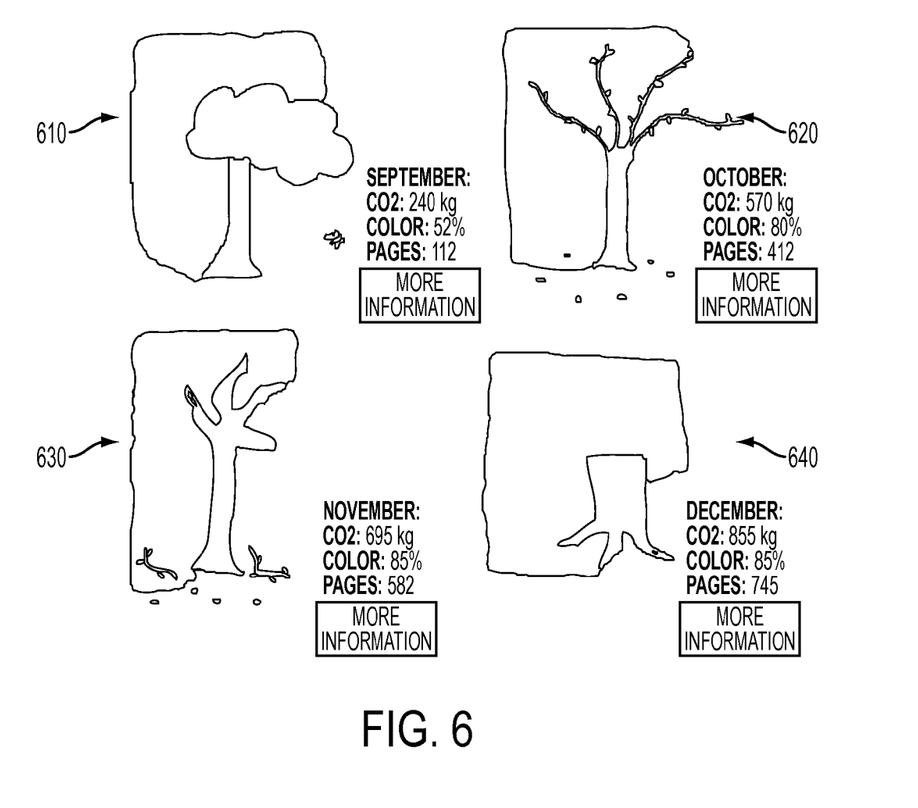
FIG. 6 illustrates a plurality of iterations of a graphic related to resource usage that can be output via a permanent widget, in association with an exemplary embodiment.

FIG. 6 illustrates an exemplary permanent widget wherein a graphic is presented in four disparate iterations, 610, 620, 630 and 640. The iteration 610 shows a tree that is healthy wherein a full population of foliage is observed. The iteration 620 shows a marked decrease in foliage and the iteration 630 shows a marked depreciation from the iteration 620. The iteration 640 shows a tree which is obviously dead and representative of continuous behavior that is outside of predetermined benchmarks. Each iteration 610, 620, 630, 640 can further include textual information relative to resource usage such as the amount of color utilized for previous print jobs, the weight of $CO_2$ associated with the print jobs over a predefined period, the number of pages printed within the predefined period, etc.

It is to be appreciated that the iterations 610, 620, 630, 640 are presented to a user one at a time and can change over substantially any time period to reflect a real time depiction of resource usage in view of predetermined benchmarking. That is to say, resource usage which is well within a predetermined benchmarking can cause the iteration 610 to be generated and displayed whereas a resource usage outside of such benchmarking over a predetermined period of time can cause generation of iteration 620, 630 to illustrate to the user that their resource usage is detrimental to the environment. Similarly, if the negative behavior is corrected by the user, the iteration displayed can change commensurate therewith wherein the iteration 630 can give way to the iteration 620 and eventually to the iteration 610 once an optimal resource usage behavior is realized.

By presenting iterations 610, 620, 630, 640 via the permanent widget, a more color intensive graphic can be provided thereby diversifying content reviewed by a user from other information with which he/she are continuously confronted. As a result, the user can absorb the information presented via the widget in a more efficient way than one presented through large amounts of text. In other words, a layout that is distinguished from other content can attract a user's attention. Each iteration 610, 620, 630, 640 can further include a more information button that allows access to information complementary to that already presented in the iterations 610, 620, 630, 640. For example, an explanation of the $CO_2$ rating calculation can be provided such as what actions a user has done to receive a particular rating. In addition, solutions can be suggested to improve a user's rating in the future, for example, about what a user can do to reduce his/her $CO_2$ emissions, color and paper usage.

As previously described, within the domain of printing systems, motivational platforms can be provided to increase users' awareness of their printing habits. In addition, printing systems may also include various 'smart' printing drivers, i.e., print drivers with recommendations or help features that are configured to reduce an environmental impact.

Now is described a method and system for augmenting the capabilities of both environmentally smart printing drivers and motivational platforms by creating a synergy between these two domains.

The augmented print drivers take advantage of the personal printing history and even more importantly of the group printing history where the user belongs, in order to enhance its recommendation, and the augmented motivational platform builds upon the user following or not following the smart drivers' recommendation.

The method and system to provide this synergy between smart drivers and a motivational platform is the subject of the following description, which is further illustrated by examples of a Print Awareness Tool of a motivational platform previously described, and smart drivers as previously described.

The augmented print driver/motivational platform includes the integration of these 2 types of applications, i.e., motivational platforms and smart drivers, thereby enabling these applications to provide additional features aimed towards printing impact reduction.

As previously described, a motivational platform provides its users with awareness of their printing usage. Through this raised awareness, it aims at helping users to reduce their printing environmental impact, for example by printing fewer pages, more often in duplex, more often in black and white, etc.

Visually, a motivational platform can take the form of a flower, as illustrated in FIG. 6, where a number of petals disappear with each significant printing job.

In addition, a motivational platform can include some profiling capabilities, meaning each end user is included in a 'user group', i.e., community, where members share a similar printing usage profile.

Summarily, provided now are mutual enhancements between printing impact motivational platforms and smart drivers' platforms, as well as a dual method along which a motivational platform is enhanced through the use of data related to a user's level of adherence to a smart print drivers recommendation, i.e., greenest print settings and greenest printers, and a smart print driver is enhanced through the use of personal and community-based printing history aggregated by a motivational platform.

Figure 7:
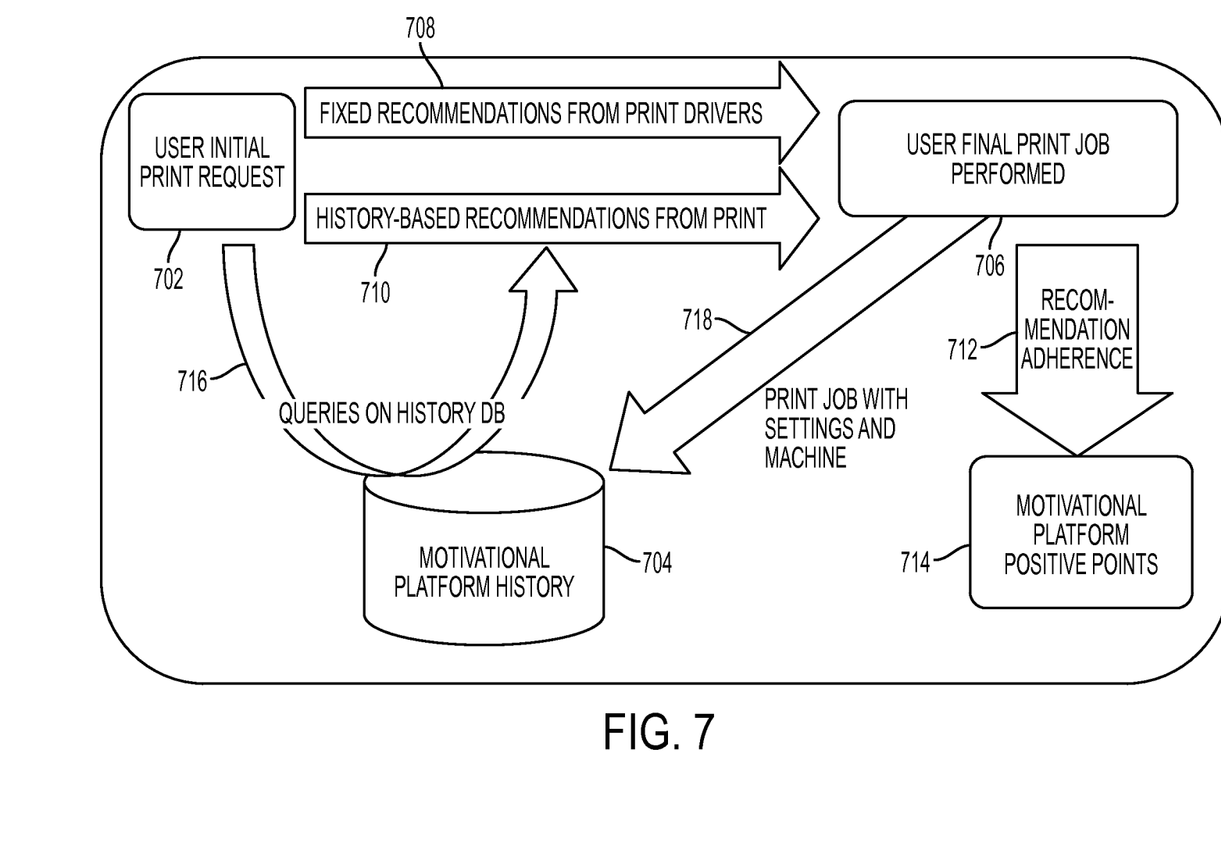
FIG. 7 is a block diagram of a method to promote the reduction of an environmental impact of an associated printing system according to an exemplary embodiment of this disclosure.

As illustrated, the method enhances a motivational platform 714 through the use of data related to a user's level of adherence 712 to a smart print drivers recommendations 708 and 710, where every time the user prints utilizing the smart print driver 702, the user is provided with recommendations relative to the greenest printers and the greenest print settings. The print driver provides fixed recommendations 708 and history-based recommendations.

Specifically, for each print job 706 submitted, a user's level of adherence to the print drivers recommendations 712 by an evaluation of delta between the recommended settings/printers 708 and 710 and the used settings/printers is ranked on a predefined scale from 0% to 100%.

For each of these print jobs, this ranking corresponds through a configured mapping to either some gain of abstract points in the motivational platform, or the absence of influence on the user's account, or some loss of points.

The smart print driver is enhanced through the use of personal and community-based printing history 716 aggregated by the motivational platform 704. Specifically, every time a user prints any material, the motivational platform records this event 718 in his/her personal printing history, thereby building the personal and community printing histories 704, this personal and community history is recorded and complied by the motivational platform in the background.

Now, when a user uses a smart driver in order to trigger a print job, the recommendations provided by the smart driver includes a recall of printers and print settings used in the personal history of the user, but more importantly the print settings used by the best users in the community, i.e., best practices, and the list of printers used by users in the same community, enhancing significantly the relevance of the recommended print settings and list of printers. The credibility of the recommendations is provided by crowd-wisdom, thereby reducing inappropriate printer settings, and the use of badly configured or unreliable printers.

In addition, the augmented method and system explicitly displays positive/negative points 714 to be gained in the motivational platform, associated with each recommendation, thereby maximizing the feeling of empowerment of the user to make an informed decision.

Figure 8:
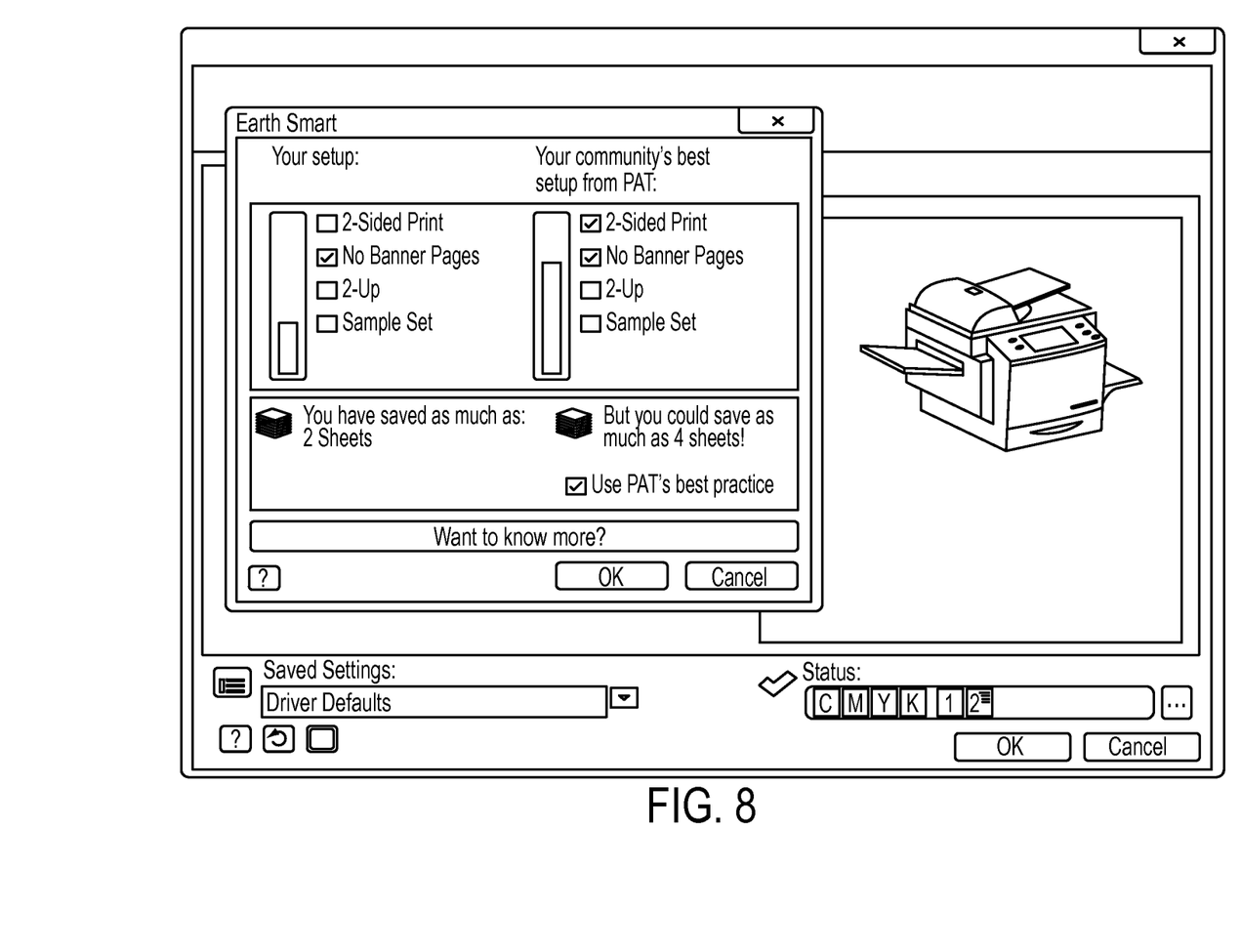
FIG. 8 is a screen shot of an Earth Smart Recommendation menu according to an exemplary embodiment of this disclosure.

FIG. 8 is a screen shot of an Earth Smart Recommendation menu according to an exemplary embodiment of this disclosure.

According to one aspect of the augmented motivational platform and print driver, the use of individual printing history is used to offer the user the choice of a printer amongst a 'last used' list, and, through the use of community history, offer a "Sort by most used printer by your group' view.

According to another aspect, a 'discovered printers' and 'customized printers' views for the current location only is provided.

The use of PAT printing history enables the print driver to offer a last-used view across all locations where the user has already printed in the past. The nomad user, for example in an airport lobby, can therefore put a print job in a queue for a printer, for example, at his office location, where the job will be actually triggered when he logs in again of his office network. There is no need for the user to remember "I must print this Monday morning when I get back to my office".

According to another aspect, displayed to the user are potential negative or positive points that would occur by complying with each recommendation by the driver. This is in contrast to present methods and systems where the user can still 'guess' that one or the other recommendation is better valued for the motivational platform, but this is still a 'guess', therefore it is not satisfactory.

According to another aspect, the use of the motivational platform compiled printing history from the user's community enables leveraging the expertise of the best users in the community by extracting from the print history their specific tweaks on print settings and printers, and recommending them to the rest of the community. In this way, the best print settings, with respect to environmental impact reduction, gain more and more users.

According to another aspect, the motivational platform compiled printing histories, both personal and communitarian, are synchronized between a local database of users' computers and a global motivational platform server database. In case of a temporary de-synchronization due to a long period of time without an operating company network, the interactions described could potentially not reflect some recent evolutions, yet the system still provides value as it is an improvement over a non-integrated system. The printing histories are locally stored such that they can be accessed by the print drivers.

Regarding the smart print drivers, for every print job, information about whether or not the user has followed recommendations provided by the print driver is stored on a local motivational platform database on the fly, and influences the print credit/debit associated with the user. This data is subsequently synchronized with a central motivational platform database at the time of the next company network logging.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine, e.g., a computer. For instance, a machine-readable medium includes read only memory ("ROM"); random access memory ("RAM"); magnetic disk storage media; optical storage media; flash memory devices; and electrical, optical, acoustical or other form of propagated signals, e.g., carrier waves, infrared signals, digital signals, etc., just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of operating a printing system to promote the reduction of an environmental impact by a user of the printing system, the printing system including one or more printing devices, one or more user devices operatively associated with the printing devices, one or more print drivers operatively associated with the one or more printing devices and the one or more user devices, each print driver configured to provide to a user device one or more available user selectable printer settings and one or more recommended user selectable printer settings associated with printing the print job, and a motivational platform operatively associated with the one or more printing devices and the one or more print drivers, the motivational platform configured to record and communicate to the one or more printer devices a printing activity of the one or more users and the one or more user selectable printer settings associated with the historical printing activity, the method comprising:

a) one of the user devices providing a print job to the print driver to be printed by one of the printing devices;
  b) the print driver providing the one or more available user selectable printer settings for display to the user on a display associated with the user device and the one or more recommended user selectable printer settings associated with the print job, the one or more recommended user selectable printer settings originating from the motivational platform and associated with one or both of the historical printing activity of the user and a historical printing activity of one or more other users of the printing system;

c) the user configuring the one or more printer settings for printing the print job;

d) the print driver communicating the print job and user configured one or more printer settings to the printing device;

e) the print driver communicating to the motivational platform information associated with the print job communicated to the printing device, the information including a user identifier, a print job identifier, the one or more recommended user selectable printer settings, and the one or more user configured printer settings; and f) the motivational platform storing the communicated information associated with the print job.

2. The computer-implemented method of operating a printing system according to claim 1, wherein the motivational platform assigns positive or negative points to the user of the printing system, the positive and negative points associated with the user following or not following the one or more recommended user selectable printer settings.

3. The computer-implemented method of operating a printer system according to claim 1, wherein the one or more recommended user selectable printer settings include one or more of 2-sided print, no banner printing, and black and white printing.

4. The computer-implemented method of operating a printer system according to claim 1, wherein the motivational platform aggregates the communicated information for a plurality of print jobs and a plurality of users.

5. The computer-implemented method of operating a printer system according to claim 1, wherein the information includes one or more of user IDs, print job submission time, document title, document length, print job type, textual content features, visual features and page coverage features.

6. The computer-implemented method of operating a printer system according to claim 1, wherein the one or more recommended user selectable printer settings includes printer settings associated with a least environmentally impactable user of a group of users to which the user belongs.

7. The computer-implemented method of operating a printer system according to claim 1, wherein the one or more recommended user selectable printing settings includes a recommended printing device associated with the least environmental impact of the one or more printing devices.

8. The computer-implemented method of operating a printer system according to claim 1, wherein the information is embedded as metadata included with a digital representation of the print job.

9. A computer program product comprising a non-transitory recording medium storing instructions which, when executed by a computer processor, perform the method of claim 1.

10. A system comprising memory which stores instructions for performing the method of claim 1 and a processor in communication with the memory which implements the instructions.

11. A system to promote the reduction of an environmental impact by one or more users of an associated printing system, the system comprising:

printing device data including information related to a print job sent to a printing device by an active user;

community data including information related to historical printing activity by members of a community including the one or more users of the associated printing system;

a motivational platform component including a profiling component configured to receive the printing device data and the community data, and configured to evaluate historical printing activity by the active user compared to historical printing activity of one or more other users within the community; and a printer driver component configured to receive printer settings from the profiling component based on the evaluation, generate one or more recommended user selectable printer settings based on the received printer settings from the profiling component and graphically display the recommended user selectable printer settings to the active user prior to the active user initiating a submission of the print job to the printing device.

12. The system to promote the reduction of an environmental impact according to claim 11, wherein the motivational platform component is configured to assign positive or negative points to the user of the associated printing system, the positive and negative points associated with the user following or not following the one or more recommended user selectable printer settings.

13. The system to promote the reduction of an environmental impact according to claim 11, wherein the one or more recommended user selectable printer settings include one or more of 2-sided print, no banner printing, and black and white printing.

14. The system to promote the reduction of an environmental impact according to claim 11, wherein the motivational platform aggregates the communicated information for a plurality of print jobs and a plurality of users.

15. The system to promote the reduction of an environmental impact according to claim 11, wherein the information includes one or more of user IDs, print job submission time, document title, document length, print job type, textual content features, visual features and page coverage features.

16. The system to promote the reduction of an environmental impact according to claim 11, wherein the one or more recommended user selectable printer settings includes printer settings associated with a least environmentally impactable user of a group of users to which the user belongs.

17. The system to promote the reduction of an environmental impact according to claim 11, wherein the one or more recommended user selectable printing settings includes a recommended printing device associated with the least environmental impact of the one or more printing devices.

18. The system to promote the reduction of an environmental impact according to claim 11, wherein the information is embedded as metadata included with a digital representation of the print job.

\* \* \* \* \*